United States Patent
Badar et al.

(10) Patent No.: US 6,718,420 B1
(45) Date of Patent: Apr. 6, 2004

(54) PHASE MANIPULATION OF INTERTWINED BUS SIGNALS FOR REDUCTION OF HOSTILE COUPLING IN INTEGRATED CIRCUIT INTERCONNECTS

(75) Inventors: John Thomas Badar, Austin, TX (US); John Mack Isakson, Austin, TX (US); Huajun Wen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 486 days.

(21) Appl. No.: 09/773,191

(22) Filed: Jan. 31, 2001

(51) Int. Cl.[7] .............. G06F 13/14; H01B 9/00; H03K 19/003
(52) U.S. Cl. .............. 710/305; 174/27; 326/30
(58) Field of Search .................. 710/305, 306, 710/307; 326/30, 32, 34, 87, 41; 174/27

(56) References Cited

U.S. PATENT DOCUMENTS 6,211,456 B1 * 4/2001 Seningen et al. ............. 174/27
6,566,904 B2 * 5/2003 van Bavel et al. ........... 326/30

* cited by examiner

*Primary Examiner*—Khanh Dang
(74) *Attorney, Agent, or Firm*—Duke W. Yee; Casimer K. Salys; Stephen J. Walder, Jr.

(57) ABSTRACT

A bus having improved performance over prior art busses is provided. In one embodiment, the bus includes a first wire having a plurality of intervals, a second wire having a plurality of intervals, and a third wire having a plurality of intervals. The first, second, and third wires are intertwined with each other. Some intervals of the wires include a buffer and some other intervals of the wires include an inverter. In some embodiments, the intervals of the wires that include the buffer are middle wires and in other embodiments, the intervals of the wires the include the buffer are outer wires.

28 Claims, 2 Drawing Sheets

PHASE MANIPULATION OF INTERTWINED BUS SIGNALS FOR REDUCTION OF HOSTILE COUPLING IN INTEGRATED CIRCUIT INTERCONNECTS

BACKGROUND OF THE INVENTION

1. Technical Field

The present invention relates to integrated circuits and, more particularly, to improve interconnects.

2. Description of Related Art

In modern integrated circuits, interconnect (wire) delays are rapidly becoming more of a problem. As technology improves and chip dimensions shrink, transistors are getting faster, but resistance and capacitance of wires are not improving as quickly. As a result, the interconnect delays are rapidly becoming the critical design constraint, preventing chips from operating at higher frequencies. Current art recommends increasing the width of the interconnects, thus reducing their resistance, or spacing the interconnects further apart, reducing the effects of capacitive coupling with neighboring interconnects. However, both of these courses of action utilize more wiring resources than is desirable. In all cases there is some limit to the amount of width and spacing growth that can be done. This problem is especially bad for signal busses which frequently must travel from one side of a chip to the other. Periodically repeater circuits must be placed along a bus's path to repower the signals, because the resistance and capacitance of the interconnect has degraded the signal quality. Each interconnect wire will have two neighboring interconnects on the same metal layer. A wire can be affected by its neighbors in the following ways: Hostile—Neighbor is switching in the opposite direction; Friendly—Neighbor is switching in the same direction; Quiet—Neighbor is not switching.

If both neighbors are switching in the opposite direction the signal of interest is switching, a signal is said to have two "hostile neighbors". This hostility can significantly increase the amount of time required for a signal to propagate along its path. In other words, it slows down the speed of signal propagation. Current methods of reducing effects of hostility include increasing the space between potentially hostile wires, increasing the width of wires (to reduce resistance), or inserting an additional quiet wire (a "shield") between each pair of signal wires. This invention is better, because it makes more efficient use of the precious wiring resources available on chips. Increasing wires widths and spacings means that fewer wires can fit in a given area. Similarly inserting quiet wires between signal wires also uses resources which otherwise could be used for other integrated circuit components. Therefore, it would be desirable to have an improved integrated circuit interconnect design that reduces hostile coupling while improving the speed of performance and minimizing die space usage by the interconnect.

SUMMARY OF THE INVENTION

The present invention provides a bus having improved performance over prior art busses. In one embodiment, the bus includes a first wire having a plurality of intervals, a second wire having a plurality of intervals, and a third wire having a plurality of intervals. The first, second, and third wires are intertwined with each other. Some intervals of the wires include a buffer and some other intervals of the wires include an inverter. In some embodiments, the intervals of the wires that include the buffer are middle wires and in other embodiments, the intervals of the wires the include the buffer are outer wires.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
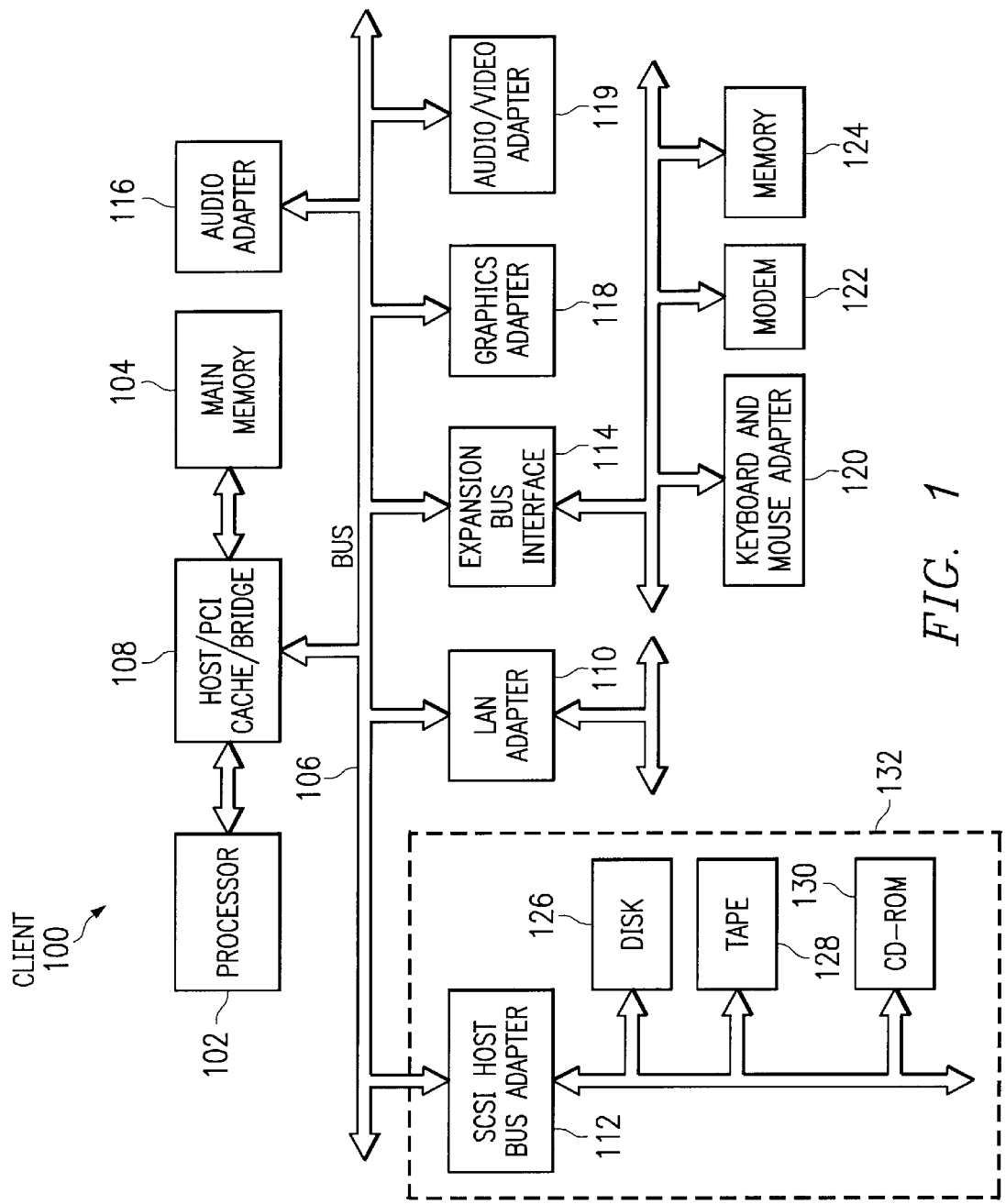
FIG. 1 depicts a block diagram illustrating a data processing system in which the present invention may be implemented.

With reference now to the Figures and, in particular, with reference to FIG. 1, a block diagram illustrating a data processing system is depicted in which the present invention may be implemented. Data processing system 100 is an example of a client computer. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. Small computer system interface (SCSI) host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system, such as Windows 2000, which is available from Microsoft Corporation. An object oriented programming system such as Java may run in conjunction with the operating system and provide calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the processes of the present invention may be applied to a multiprocessor data processing system.

As another example, data processing system 100 may be a stand-alone system configured to be bootable without relying on some type of network communication interface, whether or not data processing system 100 comprises some type of network communication interface. As a further example, data processing system 100 may be a Personal Digital Assistant (PDA) device, which is configured with ROM and/or flash ROM in order to provide non-volatile memory for storing operating system files and/or user-generated data.

The depicted example in FIG. 1 and above-described examples are not meant to imply architectural limitations. For example, data processing system 100 also may be a notebook computer or hand held computer in addition to taking the form of a PDA. Data processing system 100 also may be a kiosk or a Web appliance.

Figure 2:
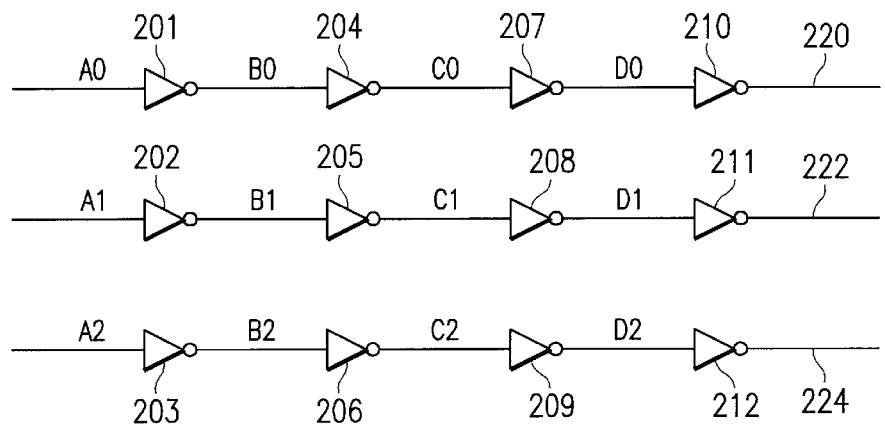
FIG. 2 depicts a typical interconnect arrangement of three signal wires is depicted in accordance with the prior art.

With reference to FIG. 2, a typical interconnect arrangement of three signal wires is depicted in accordance with the prior art. Signals A0, A1, and A2 propagate from left to right along a three wire wide path, with banks of inverters 201–212 repowering the signals at equally spaced intervals. The signals have been renamed at each successive stage, but signal A0 propagates to D0, A1 to D1, and A2 to D2.

If signals A0 and A2 are switching in the opposite direction from what A1 is switching (i.e., signals A0 and A2 are switching from 0 to 1 while signal A1 is switching from 1 to 0), then A1 sees two hostile neighbors. Consequently, B1, C1, and D1 will also see two hostile neighbors. The outer wires 220 and 224 (corresponding to signals A0 & A2, B0 & B2, etc.) have power supply busses as their other neighbors, so they each see only one hostile neighbor. The power bus is considered to be a "quiet" neighbor. Therefore, the signals traveling on the outer wires 220 and 224 will reach stage D (i.e. D0 and D2) faster than the signal traveling on the middle wire 222 will reach stage D (i.e. D1). Since a bus is considered to be only as fast as its slowest signal, it is desirable to make them all travel at the same speed. It is also desirable to reduce the effects of hostile neighbors as much as possible. The present invention, as described below, almost completely eliminates the effects of hostile neighbors, dramatically improving the speed of the integrated circuit busses.

Figure 3:
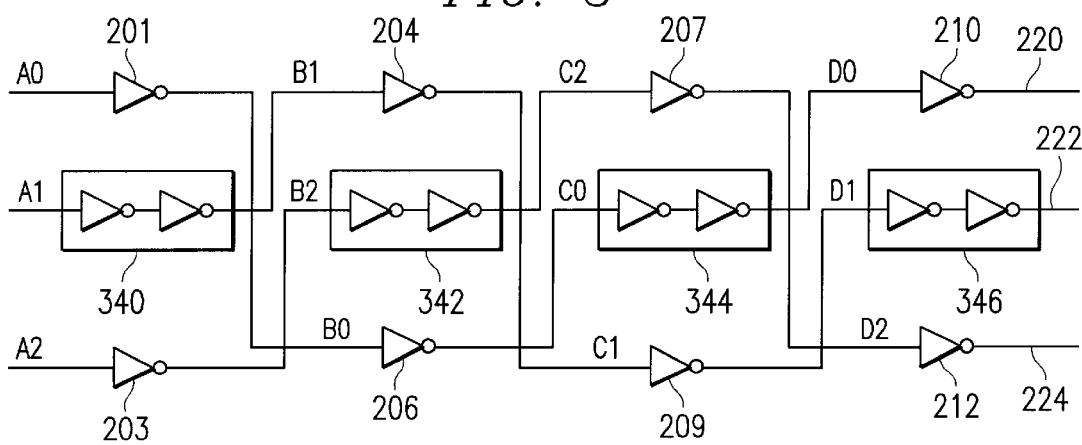
FIG. 3 depicts an interconnect layout design in accordance with a preferred embodiment of the present invention.

With reference now to FIG. 3, an interconnect layout design is illustrated in accordance with a preferred embodiment of the present invention. Interconnect design 300 may be implemented in a bus, such as, for example, bus 106 in FIG. 1. However, more typically, the interconnect design 300 is implemented within a single chip, such as, for example, processor 102 in FIG. 1, to connect various components within the chip. The interconnect design 300 is described herein with reference to three wires, however, the design 300 may be extended to bus designs having more than three wires. Typically with busses having more than three wires, the bus wires are grouped into groups of three with each group arranged according to the design of the present invention. Groupings of more than three wires are also possible, but the design is more complicated and the number and arrangement of buffers is different.

There are two key differences between the interconnect layout design 300 of the present invention and the prior art as depicted in FIG. 2. First, the signals are "intertwined", i.e., signal A1 propagates along a middle wire, but at the next stage B1 has moved to an outer wire. Thus, at state A1, the signal could have two hostile neighbors, but at the next state it will have no more than one hostile neighbor, because its middle inverter has been changed to a non-inverting buffer 340–346. This manipulation of signal phases allows a signal which was hostile to its neighbor(s) at one stage to be "friendly" to its neighbor(s) at the next stage. Conversely, a friendly wire can be transformed into a hostile one. But the net effect along the entire bus closely approximates a bus with all quiet neighbors.

For example, assume that A0 and A2 are both hostile to A1. At the next stage, B1 has maintained the same phase that A1 had, and it has moved to an outer wire where it will have one quiet neighbor. Its other neighbor, B2, will be friendly, because it has gone through an inverter, thus putting it in phase with B1. At the next stage the signal has moved again, to the other outer wire. It again has one quiet neighbor and C0 is friendly. At the last stage the original arrangement of signals has been restored. At this point, D1 has two hostile neighbors. Thus, B1 had one friendly and one quite neighbor, C1 also had one friendly and one quiet neighbor, and D1 had the worst possible case with two hostile neighbors. However, taking all three segments of the path into consideration from B1 to D1, there have been a total of two hostile neighbors, two friendly neighbors, and two quiet neighbors. Assuming that the two friendly neighbors counteract the negative effects of the two hostile neighbors, the net result is a interconnect (or bus) which behaves as if all neighbors are quiet.

Circuit simulation tools have been used to prove that this assumption is valid. The performance of these busses matches the performance of busses with all quiet neighbors within 3.4%. Depending on the length of the interval between inverter/buffer banks, this invention produces busses which are 13–22% faster than the current art such as depicted in FIG. 2.

Although the present invention has been presented with reference to a three wire busses for illustration purposes, the present invention may be applied to buses having any number of wires in excess of three as well. Furthermore, although the present invention has been described with the buffer placed on intervals of wire where the wire is between the other two wires, in other embodiments, the buffer may be placed on the outside wires and the inverters placed on the middle wire.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. An interconnect bus for use in a data processing system, comprising:

a first wire having a plurality of intervals;

a second wire having a plurality of intervals; and a third wire having a plurality of intervals;

wherein the first, second, and third wire are intertwined;

a first set of intervals includes intervals of the first, second and third wire that include a buffer; and a second set of intervals includes intervals of the first, second and third wire that include an inverter.

2. The interconnect bus as recited in claim 1, wherein the first set of intervals of the first, second and third wire are intervals in which the first, second and third wire, respectively, are middle wires.

3. The interconnect bus as recited in claim 1, wherein the second set of intervals of the first, second and third wire are intervals in which the first, second and third wire, respectively are outer wires.

4. The interconnect bus as recited in claim 1, wherein the buffer comprises two inverters in series connection.

5. The interconnect bus as recited in claim 1, wherein the first, second and third wires are substantially parallel to each other during each corresponding interval.

6. The interconnect bus as recited in claim 1, wherein the interconnect bus is contained within a single integrated circuit chip.

7. The interconnect bus of claim 1, wherein the first, second, and third wire are intertwined to generate an intertwined wire having a plurality of stages, and wherein:
    a first set of stages of the intertwined wire includes an inverter in the first wire and the third wire and a buffer in the second wire;
    a second set of stages of the intertwined wire includes an inverter in the first wire and the second wire and a buffer in the third wire; and
    a third set of stages of the intertwined wire includes an inverter in the second wire and third wire and a buffer in the first wire.

8. An interconnect bus, comprising:
    a plurality of wires organized into three wire groups wherein each three wire group comprises:
        a first wire having a plurality of intervals;
        a second wire having a plurality of intervals; and
        a third wire having a plurality of intervals;
        wherein the first, second, and third wire are intertwined;
        a first set of intervals includes intervals of the first, second and third wire that include a buffer; and
        a second set of intervals includes intervals of the first, second and third wire that include an inverter.

9. The interconnect bus as recited in claim 8, wherein the first set of intervals of the first, second and third wire are intervals in which the first, second and third wire, respectively, are middle wires.

10. The interconnect bus as recited in claim 8, wherein the second set of intervals of the first, second and third wire are intervals in which the first, second and third wire, respectively, are outer wires.

11. The interconnect bus as recited in claim 8, wherein the buffer comprises two inverters coupled in series.

12. The interconnect bus as recited in claim 8, wherein the interconnect bus coupled components are within a single integrated circuit chip.

13. The interconnect bus as recited in claim 12, wherein the single integrated circuit chip is a processor.

14. The interconnect bus as recited in claim 12, wherein the integrated circuit chip is a memory chip.

15. The interconnect bus of claim 8, wherein the first, second, and third wire are intertwined to generate an intertwined wire having a plurality of stages, and wherein:
    a first set of stages of the intertwined wire includes an inverter in the first wire and the third wire and a buffer in the second wire;
    a second set of stages of the intertwined wire includes an inverter in the first wire and the second wire and a buffer in the third wire; and
    a third set of stages of the intertwined wire includes an inverter in the second wire and third wire and a buffer in the first wire.

16. A data processing system, comprising:

two or more components; and a bus communicably coupling the two or more components; wherein the bus comprises a plurality of wires organized into three wire groups wherein each three wire group comprises:
    a first wire having a plurality of intervals;
    a second wire having a plurality of intervals; and
    a third wire having a plurality of intervals;
    wherein the first, second, and third wire are intertwined;
    a first set of intervals include intervals of the first, second and third wire that include a buffer; and
    a second set of intervals includes intervals of the first, second and third wire that include an inverter.

17. The data processing system as recited in claim 16, wherein the first set of intervals of the first, second and third wire are intervals in which the first, second and third wire, respectively, are middle wires.

18. The data processing system as recited in claim 16, wherein the second set of intervals of the first, second and third wire are intervals in which the first, second and third wire, respectively, are outer wires.

19. The data processing system as recited in claim 16, wherein the buffer comprises two inverters in series connection.

20. The data processing system as recited in claim 16, wherein the data processing system is a laptop computer.

21. The data processing system as recited in claim 16, wherein the data processing system is a personal digital assistant.

22. The data processing system as recited in claim 16, wherein each the first, second and third wires are substantially parallel to each other during each corresponding interval.

23. The data processing system as recited in claim 16, wherein at least one of the components is a processor.

24. The data processing system as recited in claim 16, wherein at least one of the components is a memory device.

25. The data processing system as recited in claim 16, wherein the bus resides within a single integrated circuit chip.

26. The data processing system as recited in claim 25, wherein the single integrated circuit chip is a processor.

27. The data processing system as recited in claim 25, wherein the single integrated circuit chip is a memory chip.

28. The data processing system of claim 16, wherein the first, second, and third wire are intertwined to generate an intertwined wire having a plurality of stages, and wherein:
    a first set of stages of the intertwined wire includes an inverter in the first wire and the third wire and a buffer in the second wire;
    a second set of stages of the intertwined wire includes an inverter in the first wire and the second wire and a buffer in the third wire; and
    a third set of stages of the intertwined wire includes an inverter in the second wire and third wire and a buffer in the first wire.

* * * * *

UNITED STATES PATENT AND TRADEMARK OFFICE
CERTIFICATE OF CORRECTION

| | |
|---|---|
| PATENT NO. | : 6,718,420 B1 |
| APPLICATION NO. | : 09/773191 |
| DATED | : April 6, 2004 |
| INVENTOR(S) | : Badar et al. |

It is certified that error appears in the above-identified patent and that said Letters Patent is hereby corrected as shown below:

Col. 6, line 36: after "wherein" delete "each".

Signed and Sealed this

Twenty-eighth Day of November, 2006

JON W. DUDAS
*Director of the United States Patent and Trademark Office*